UNITED STATES PATENT OFFICE.

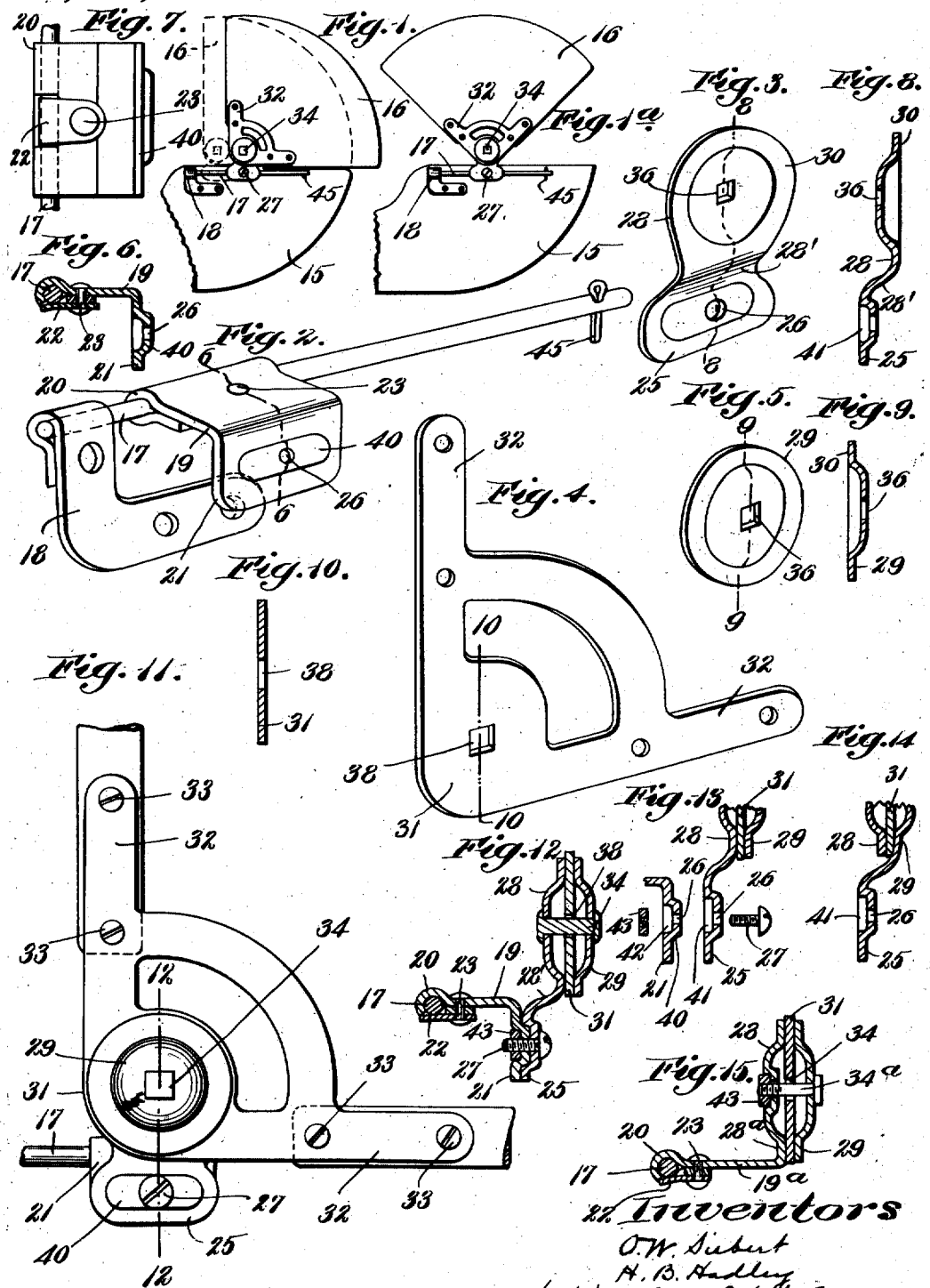

OTTO W. SIEBERT, OF GARDNER, AND HERBERT B. HADLEY, OF EAST TEMPLETON, MASSACHUSETTS, ASSIGNORS TO BAY STATE METAL WHEEL COMPANY, OF EAST TEMPLETON, MASSACHUSETTS, A CORPORATION OF MAINE.

ADJUSTABLE HOOD-SUPPORT FOR BABY-CARRIAGES.

1,282,474.   Specification of Letters Patent.   Patented Oct. 22, 1918.

Application filed May 23, 1918. Serial No. 236,125.

*To all whom it may concern:*

Be it known that we, OTTO W. SIEBERT and HERBERT B. HADLEY, citizens of the United States, residing at Gardner and East Templeton, respectively, in the county of Worcester and State of Massachusetts, have invented new and useful Improvements in Adjustable Hood-Supports for Baby-Carriages, of which the following is a specification.

This invention relates to a baby carriage having a hood, which has a pivotal and a sliding connection with the carriage body, so that adjustment of the hood may be effected by swinging it on a horizontal axis which is transverse to the body, and by moving it forward and backward in a rectilinear direction. The object of the invention is to provide improved supporting means, permitting said swinging and rectilinear adjusting movements of the hood, and frictionally securing the hood in any position to which it may be adjusted, said means also permitting a quick and convenient separable connection of the hood to the body.

The invention is embodied in the improvements which we will now proceed to describe and claim.

Of the accompanying drawings forming a part of this specification,—

Figure 1 is a side elevation of a portion of a baby carriage having hood-supporting means embodying the invention.

Fig. 1ª is a view similar to Fig. 1, showing the hood in a raised position.

Fig. 2 is a perspective view of the guide rod shown by Fig. 1, and the slide thereon.

Figs. 3, 4, and 5 are perspective views of members of the friction hinge.

Fig. 6 is a section on line 6—6 of Fig. 2.

Fig. 7 is a bottom plan view of the slide shown by Fig. 2.

Fig. 8 is a section on line 8—8 of Fig. 3.

Fig. 9 is a section on line 9—9 of Fig. 5.

Fig. 10 is a section on line 10—10 of Fig. 4.

Fig. 11 is an enlargement of a portion of Fig. 1.

Fig. 12 is a section on line 12—12 of Fig. 11.

Fig. 13 is a fragmentary sectional view, showing the friction hinge disconnected from the slide.

Fig. 14 is a view similar to a portion of Fig. 13, showing a modification.

Fig. 15 is a view similar to Fig. 12, showing another modification.

The same reference characters indicate the same parts in all of the figures.

In the drawings, 15 is the body, and 16 the hood of a baby carriage, these being of any suitable form and construction. The opposite sides of the hood are connected with the opposite sides of the body by adjustable supports, each of which is a duplicate of the other, so that a description of one support will suffice.

17 is a horizontal guide attached to one side of the body, the guide being preferably a cylindrical metal rod, suitably engaged at one end with a bracket 18 attached to the body.

19 is a slide movable on the guide 17, and preferably composed of a metal plate bent to form at its inner end a socket 20 embracing the guide, and at its outer end to form an integral ear 21 constituting a seat for a member of the friction hinge, hereinafter described.

The slide is provided with a brake shoe 22, (Figs. 6 and 7), secured by a rivet 23 and bearing yieldingly on the guide to provide a frictional engagement between the slide and the guide adapted to retain the slide in any position to which it may be moved on the guide. To the hood is attached a friction hinge, which, in the embodiment of the invention shown in Figs. 1 to 13, inclusive, includes a non-swinging ear 25 formed to bear on the seat 21, said ear and seat being provided with registering holes 26 to receive a connecting bolt 27. The friction hinge includes inner and outer cupped side members 28 and 29, each having a flat annular face 30, an intermediate swinging member 31 having flat side faces in frictional contact with the annular faces 30, and also having means preferably embodied in ears or arms 32, perforated to receive screws 33, whereby the swinging member may be rigidly attached to the frame of the hood, and a stud 34 having enlarged ends or heads preferably formed by upsetting the ends of the stud, the latter constituting a rivet. The ear 25 is preferably formed on the inner side member 28, although, as shown by Fig. 14, it may be formed on the outer member 29.

The side members 28 and 29 have orifices 36 to receive the stud 34, said orifices and the stud being preferably squared and the stud closely fitting the orifices, so that the side member 29 is prevented by the bolt from turning relatively to the non-swinging side member 28, the latter being prevented from turning by the attachment of its ear 25 to the seat 21 on the slide.

The swinging member 31 is provided with a larger orifice 38 through which the stud 34 passes loosely, the swinging member being adapted to turn on the stud to permit swinging movements of the hood.

In assembling the friction hinge members, the outer and inner members are pressed against the swinging member with sufficient force to maintain the hood by friction in any position to which it is capable of swinging.

The seat 21 and ear 25 are preferably embossed to form a projection 40 on the outer side of the seat, and a recess 41 in the inner side of the ear, the recess receiving the projection, so that the seat and ear are interengaged to prevent the ear from turning on the bolt 27. The boss which provides the projection 40, also provides a recess 42 which receives the bolt nut 43 and prevents the latter from turning.

It will now be seen that the hood may be adjusted rearwardly from the forward position shown by dotted lines in Fig. 1, to any rearward position permitted by the length of the guides 17, and is retained by friction in any position to which it may be thus moved. It will also be seen that the friction hinges, which move with the slides, retain the hood in any position to which it is capable of swinging.

In the embodiment of the invention above described, the friction hinges are carried wholly by the hood, so that the body and hood may be assembled by the simple operation of inserting the bolts 27 in the orifices 26, and disconnected by removing the bolts.

The ear 28 is offset at 28' to offset the friction hinge from the slide 19, and from the side of the body 15.

The non-swinging hinge member provided with the ear 25 constitutes a supporting member which bears on one side of the swinging member, and is prevented from turning by its attachment to the slide. The opposite hinge member bearing on the opposite side of the swinging member constitutes a clamping member which is prevented from turning or swinging with the swinging member by the squared stud 34 and the squared apertures 36.

The supporting hinge member may be integral with the slide, as shown by Fig. 15, in which 19ª designates the slide and 28ª the non-swinging or supporting hinge member. In this modification the hinge members may be either inseparably connected by a stud 34 constituting a rivet as previously described, or separably connected by a bolt 34ª, as shown by Fig. 15. In either case the hood may be connected with and separated from the body by the slide socket 20 and guide 17, the guide as here shown being supported by a bracket 18 attached to one of its ends, so that it is elsewhere unobstructed. When a cotter-pin or stop 45, engaged with the opposite end portion of the guide, is removed, the socket 20 may be moved away from the bracket and off from the guide.

It will be seen that the guide 17 and slide 19 constitute a suitable embodiment of means for slidably connecting the non-swinging member of a friction hinge with a carriage body.

As implied in the foregoing description and in the following claims, we are not limited to the specific details of the preferred embodiment of our improvements shown by the drawings, except as otherwise required in certain of the more limited claims.

We claim:

1. An adjustable hood support for baby carriages, comprising a friction hinge including a swinging member and a non-swinging member connected together, the swinging member having means for attachment to a hood, and means for slidably connecting said non-swinging member with a carriage body, said means including a guide adapted for attachment to the body, and a slide detachably connected at one end to said non-swinging member and having at its other end a socket slidably attached on said guide, the slide being provided with means for frictional engagement with the guide.

2. An adjustable hood support for baby carriages, comprising a friction hinge including a swinging member and a non-swinging member connected together, the swinging member having means for attachment to a hood, and means for slidably connecting said non-swinging member with a carriage body, said means including a guide rod, a bracket rigidly attached to one end of the rod and adapted for attachment to a carriage body, and a slide fixed at its outer end to said non-swinging member and having at its inner end a socket slidably attached to said rod, and separable from the latter by a movement away from said bracket of the free end of the rod, the slide being provided with means for frictional engagement with the guide rod.

3. An adjustable hood support for baby carriages comprising a frictional hinge having a swinging member and a non-swinging member pivotally connected together, said swinging member having means for attachment to a hood, a guide rod attachable to a carriage body, and a slide on the rod and connected to the non-swinging member, said slide having a yieldable bearing member engaging the rod to maintain the hinge in adjusted positions on the rod.

4. An adjustable hood support for baby carriages, comprising a friction hinge including a swinging member and a non-swinging member connected together, the swinging member having means for attachment to a hood, and means for slidably connecting said non-swinging member with a carriage body, said means including a guide, adapted for attachment to the body, and a slide having at its inner end a socket embracing and movable on the guide and at its outer end an integral seat bolted to said non-swinging member, the slide being provided with means for frictional engagement with the guide.

5. An adjustable hood support for baby carriages, comprising a friction hinge including a swinging member and a non-swinging member connected together, the latter member being provided with an apertured ear and said swinging member being adapted for attachment to a hood, and means for slidably connecting the hinge with a carriage body, said means including a guide adapted for attachment to the body, and a slide having at its inner end a socket embracing and movable on said guide, and at its outer end an integral apertured bearing seat, the apertured portions of said bearing seat and ear being embossed to form an interlocking projection and recess shaped to prevent relative rotation of said parts, and separably connected by a bolt, the slide being provided with means for frictional engagement with the guide.

6. An adjustable hood support for baby carriages comprising a rod constructed for attachment to a carriage body, and a hood supporting slide having a member through which the rod is loosely extended and also having a resilient member yieldably bearing against said rod to maintain the support in adjusted positions on the rod.

7. An adjustable hood support for baby carriages comprising a rod constructed for attachment to a carriage body, a hood-supporting slide plate bent to loosely embrace the rod, and a resilient plate attached to the bent plate and yieldably bearing against said rod to maintain the support in adjusted position on the rod.

8. A hinged hood support for baby carriages comprising a bracket arm attachable to a hood, a second bracket arm attachable to a carriage body and having a concavo-convex end portion, the first mentioned bracket arm having a substantially flat portion opposing the concaved face of the second arm, a concavo-convex washer having its concaved face also opposing the flat portion of the second arm, and an element extended through the opposed portions of the arms and washer for pivotally and frictionally maintaining said arms together.

In testimony whereof we have affixed our signatures.

OTTO W. SIEBERT.
HERBERT B. HADLEY.